United States Patent
Mottier et al.

(10) Patent No.: US 7,675,992 B2
(45) Date of Patent: Mar. 9, 2010

(54) METHOD OF DYNAMICALLY ASSIGNING SPREADING SEQUENCES TO USERS OF A MULTI CARRIER TRANSMISSION NETWORK

(75) Inventors: David Mottier, Rennes Cedex 7 (FR); Damien Castelain, Rennes Cedex 7 (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1154 days.

(21) Appl. No.: 10/924,982

(22) Filed: Aug. 25, 2004

(65) Prior Publication Data

US 2005/0111425 A1    May 26, 2005

(30) Foreign Application Priority Data

Sep. 1, 2003    (EP) ................... 03292147

(51) Int. Cl.
*H04L 27/00* (2006.01)
(52) U.S. Cl. ...................................... 375/295
(58) Field of Classification Search ............... 375/295, 375/299, 259, 260; 370/208, 342
See application file for complete search history.

(56) References Cited

U.S. PATENT DOCUMENTS

| | | | |
|---|---|---|---|
| 3,956,619 A | 5/1976 | Mundy et al. | |
| 6,393,047 B1* | 5/2002 | Popovic' | 375/140 |
| 6,646,979 B1* | 11/2003 | Chen et al. | 370/208 |
| 6,724,813 B1* | 4/2004 | Jamal et al. | 375/219 |
| 2006/0258316 A1* | 11/2006 | Lei et al. | 455/296 |

FOREIGN PATENT DOCUMENTS

| | | |
|---|---|---|
| EP | 1 085 689 A1 | 3/2001 |
| EP | 1 318 626 A1 | 6/2003 |

OTHER PUBLICATIONS

Yang et al., 2D orthogonal spreading codes for multicarrier DS-CDMA systems, May 2003, IEEE, p. 3277-3281.*
Angelos N. Rouskas, et al., OVSF Codes Assignment and Reassignment At the Forward Link of W-CDMA 3G Systems, IEEE, XP010614159, vol. 5, 2002, (-5- pages).
U.S. Appl. No. 10/922,939, filed Aug. 23, 2004, Mottier et al.
U.S. Appl. No. 10/964,930, Oct. 15, 2004, Mottier.

* cited by examiner

*Primary Examiner*—Sam K Ahn
(74) *Attorney, Agent, or Firm*—Oblon, Spivak, McClelland, Maier & Neustadt, L.L.P.

(57) ABSTRACT

A method of dynamically assigning spreading sequences of a group of spreading sequences to users of a Multi-Carrier transmission network and/or to at least a common signal for a plurality of users of the Multi-Carrier transmission network. The spreading sequences are put in a natural order and are dynamically assigned according to their order to users of the Multi-Carrier transmission network and/or to at least a common signal to a plurality of users of the Multi-Carrier transmission network.

14 Claims, 4 Drawing Sheets

30 →

| 1 | 1 | 1 | 1 | 1 | 1 | 1 | 1 | — 300 |
| 1 | -1 | 1 | -1 | 1 | -1 | 1 | -1 | — 301 |
| 1 | 1 | -1 | -1 | 1 | 1 | -1 | -1 | — 302 |
| 1 | -1 | -1 | 1 | 1 | -1 | -1 | 1 | — 303 |
| 1 | 1 | 1 | 1 | -1 | -1 | -1 | -1 | — 304 |
| 1 | -1 | 1 | -1 | -1 | 1 | -1 | 1 | — 305 |
| 1 | 1 | -1 | -1 | -1 | -1 | 1 | 1 | — 306 |
| 1 | -1 | -1 | 1 | -1 | 1 | 1 | -1 | — 307 |

| 1 | 1 | -1 | -1 | 1 | 1 | -1 | -1 | — 410 |
| 1 | -1 | -1 | 1 | 1 | -1 | -1 | 1 | — 411 |
| 1 | 1 | 1 | 1 | 1 | 1 | 1 | 1 | — 412 |
| 1 | -1 | 1 | -1 | 1 | -1 | 1 | -1 | — 413 |
| 1 | 1 | -1 | -1 | -1 | -1 | 1 | 1 | — 414 |
| 1 | -1 | -1 | 1 | -1 | 1 | 1 | -1 | |
| 1 | 1 | 1 | 1 | -1 | -1 | -1 | -1 | |
| 1 | -1 | 1 | -1 | -1 | 1 | -1 | 1 | |

Fig. 4

METHOD OF DYNAMICALLY ASSIGNING SPREADING SEQUENCES TO USERS OF A MULTI CARRIER TRANSMISSION NETWORK

FIELD OF THE INVENTION

The present invention concerns a method of dynamically assigning spreading sequences to a group of users of a Multi-Carrier transmission network, such as a Multi-Carrier Code Division Multiple Access transmission network, better known by the name MC-CDMA network or an Orthogonal Frequency and Code Division Multiplexing transmission network, better known by the name OFCDM.

DESCRIPTION OF RELATED ART

MC-CDMA has been receiving widespread interest for wireless broadband multimedia applications. Multi-Carrier Code Division Multiple Access (MC-CDMA) combines OFDM (Orthogonal Frequency Division Multiplex) modulation and the CDMA multiple access technique. This multiple access technique was proposed for the first time by N. Yee et al. in the article entitled "Multicarrier CDMA in indoor wireless radio networks" which appeared in Proceedings of PIMRC'93, Vol. 1, pages 109-113, 1993. The developments of this technique were reviewed by S. Hara et al. in the article entitled "Overview of Multicarrier CDMA" published in IEEE Communication Magazine, pages 126-133, December 1997.

Unlike DS-CDMA (Direct Sequence Code Division Multiple Access), in which the signal of each mobile terminal or user is multiplied in the time domain in order to spread its frequency spectrum, the signature here multiplies the signal in the frequency domain, each element of the signature multiplying the signal of a different sub-carrier.

In general, MC-CDMA combines the advantageous features of CDMA and OFDM, i.e. high spectral efficiency, multiple access capabilities, robustness in presence of frequency selective channels, high flexibility, narrow-band interference rejection, simple one-tap equalisation, etc.

A MC-CDMA base station transmitter transmits a plurality of symbols to a plurality K of users or more precisely to the mobile terminal of users. For example, a MC-CDMA transmitter located in a base station of a MC-CDMA transmission network transmits symbols to a plurality of users over a plurality of downlink transmission channels.

A complex symbol to be transmitted from the base station to user k is first multiplied by a spreading sequence denoted $c_k$. The spreading sequence consists of L "chips", each "chip" being of duration $T_c$, the total duration of the spreading sequence corresponding to a symbol period T. In order to mitigate intra-cell interference, the spreading sequences are chosen orthogonal.

The result of the multiplication of the complex symbol by the elements of the spreading sequence for user k gives L complex values that are added to the similar values to be transmitted to the other users $k' \neq k$. These values are then demultiplexed over a subset of L frequencies of an OFDM multiplex, then subjected to an Inverse Fast Fourier Transformation (IFFT). In order to prevent intersymbol interference, a guard interval of length typically greater than the duration of the impulse response of the transmission channel, is inserted in front of the symbol outputted by the IFFT module. This is achieved in practice by adding a prefix (denoted $\Delta$) identical to the end of the said symbol. The resulting symbol is then filtered and transmitted by the base station to a plurality of users.

The MC-CDMA method can essentially be regarded as a spreading in the spectral domain (before IFFT) followed by an OFDM modulation.

It is known that the propagation channel can be obstructed by houses and other obstacles situated between the transmitter and the receiver. The transmitted signal is then propagated on multiple paths, each path being delayed and attenuated differently. It should be understood that the propagation channel then acts as a filter whose transfer function varies with time.

The ability of MC-CDMA transmission networks to provide orthogonality between the signals of the different users in the network (and therefore to prevent any interference between these signals) depends on the intercorrelation properties of the spreading sequences which are assigned to the users of the network.

Typically, in the case of transmissions on a mobile radio channel from a base station to a set of mobile stations called hereinafter users or active users, the signals intended for each user are transmitted synchronously. Under these conditions, Walsh-Hadamard spreading sequences can be used to guarantee orthogonality between the users if the channel is not frequency selective.

In the European patent EP 1085689 it is disclosed a method of assigning one or more spreading sequences to a user of a MC-CDMA transmission network, wherein a spreading sequence is assigned to a user taking into account a predetermined set of spreading sequences. More precisely, the predetermined set of spreading sequences consists in the spreading sequences which minimize a function representing the interference between the spreading sequence and the spreading sequences of the said predetermined or given set.

Such method which makes it possible to reduce the effects of the interference on the performance of the transmission network under consideration needs long calculation in order to define the predetermined set of spreading sequences.

BRIEF SUMMARY OF THE INVENTION

The aim of the invention is therefore to propose a method which makes it possible to reduce the effects of the interference on the performance of the transmission network under consideration using simple spreading sequence allocation techniques.

To that end, the present invention concerns a method of dynamically assigning spreading sequences of a group of spreading sequences to users of a Multi-Carrier transmission network and/or to at least a common signal for a plurality of users of the Multi-Carrier transmission network, each element of the said spreading sequences being, at a transmitter of the said network, multiplied by data items to be transmitted and then transmitted on a corresponding sub-carrier, characterised in that the spreading sequences are put in a natural order in the group of spreading sequences and the method comprises the step of dynamically assigning the spreading sequences of the group of spreading sequences according to their order in the group of spreading sequences to users of the Multi-Carrier transmission network and/or to at least a common signal to a plurality of users of the Multi-Carrier transmission network.

According to still another aspect, the present invention concerns a device for dynamically assigning spreading sequences of a group of spreading sequences to users of a Multi-Carrier transmission network and/or to at least a common signal for a plurality of users of the Multi-Carrier transmission network, each element of the said spreading sequences being, at a transmitter of the said network, multiplied by data items to be transmitted and then transmitted on a corresponding sub-carrier, characterised in that the spreading sequences are put in a natural order in the group of spreading sequences and the device comprises means for dynamically assigning the spreading sequences of the group of spreading sequences according to their order in the group of spreading sequences to users of the Multi-Carrier transmission network and/or to at least a common signal to a plurality of users of the Multi-Carrier transmission network.

Thus, it is possible to reduce the effects of the interference on the performance of a Multi-Carrier transmission network using simple spreading sequence assignment techniques.

The inventor found that by simply assigning the spreading sequences put in the natural order in the group of spreading sequences according to their order in the group of spreading sequences to users of the Multi-Carrier transmission network and/or to at least a common signal to a plurality of users of the Multi-Carrier transmission network, interferences are reduced a lot and the assignment itself is not complex to implement. Such assignment procedure occurs continuously in a Multi-Carrier transmission network, it is then important to simplify as much as possible the assignment procedure.

According to a particular feature, an assigned spreading sequence is an available spreading sequence in the group of spreading sequence, an available spreading sequence being a spreading sequence which has not been already assigned to a user or which doesn't start by a spreading sequence which has already been assigned to a user or which doesn't start by a spreading sequence calculated from a spreading sequence which has already been assigned to a user.

More precisely, an available spreading sequence is a spreading sequence which has not been already assigned to a user at the same assignment period or which doesn't start by a spreading sequence which has already been assigned to a user at the same assignment period or which doesn't start by a spreading sequence calculated from a spreading sequence which has already been assigned to a user at the same assignment period.

Thus, it is guaranteed that a spreading sequence is not assigned at the same time to different users.

Furthermore, it is obtained requirements of users about the length and/or the number of spreading sequences to be assigned to each user of the Multi-Carrier transmission network, it is assigned the first available spreading sequences of the group of spreading sequences put in the natural order to users requiring the lowest length of spreading sequences and it is marked as not available the spreading sequences of the group of spreading sequences which are already assigned to a user or which starts by a spreading sequence which has already been assigned to a user or which starts by a spreading sequence calculated from a spreading sequence which has already been assigned to a user.

Thus, the assignment is then simplified.

According to a particular feature, it is assigned the following available spreading sequences of the group of spreading sequences according to the order of spreading sequences in the group of spreading sequences to users requiring longer length of spreading sequences than the length of already assigned spreading sequences and it is marked as not available the spreading sequences of the group of spreading sequences which are already assigned to a user or which starts by a spreading sequence which has already been assigned to a user or which starts by a spreading sequence calculated from a spreading sequence which has already been assigned to a user.

Thus, the assignment is then simplified.

According to another particular feature, a common signal requires an imposed common spreading sequence, and prior to the assignment of spreading sequences to users, the spreading sequences of the group of spreading sequences are multiplied element by element by the imposed common spreading sequence to form an obtained group of spreading sequences, the first available spreading sequence of the obtained group of spreading sequences is assigned to the common signal requiring an imposed common spreading sequence and the spreading sequence of the obtained group of spreading sequences which is already assigned to the common signal requiring an imposed common spreading sequence or spreading sequences which start by the spreading sequence which is assigned to the common signal requiring an imposed common spreading sequence or spreading sequences which start by a spreading sequence calculated from the spreading sequence which is assigned to the common signal requiring an imposed common spreading sequence are marked as not available.

By virtue of that feature, the assignment remains simplified even if they are constraints of imposed common spreading sequence required from the Multi-Carrier transmission network.

According to another particular feature, requirements of users in term of length and/or number of spreading sequences to be assigned to each user of the Multi-Carrier transmission network and requirements of common signals in term of length and/or number of spreading sequences to be assigned to common signals to the plurality of users of the Multi-Carrier transmission network are obtained, groups of users and common signals according their requirement in term of the length of spreading sequences are formed, and if at least one common signal is in the group of users and common signals requiring the lowest length of spreading sequences: the first available spreading sequences of the group of spreading sequences are assigned to each common signal in the group of users and common signals requiring the lowest length of spreading sequences, the spreading sequences of the group of spreading sequences which are already assigned to a common signal or which start by a spreading sequence which has already been assigned to a common signal or which start by a spreading sequence calculated from a spreading sequence which has already been assigned to a common signal are marked as unavailable and if at least one user is in the group of users and common signals requiring the lowest length of spreading sequences, the following available spreading sequences of the group of spreading sequences are assigned to each user of the group of users and common signals requiring the lowest length of spreading sequences and the spreading sequences of the group of spreading sequences which are already assigned to a user or which start by a spreading sequence which has already been assigned to a user or which start by a spreading sequence calculated from a spreading sequence which has already been assigned to user are marked as not available.

By virtue of that feature, the assignment remains simplified even if some variable spreading factors are used in the Multi-Carrier transmission network.

More precisely, the spreading sequences are Walsh-Hadamard sequences and the group of spreading sequences is a Walsh-Hadamard matrix whose lines are put in the natural order.

According to still another aspect, the present invention concerns a computer program which can be directly loadable into a programmable device, comprising instructions or portions of code for implementing the steps of the method according to the invention, when said computer program is executed on a programmable device. Since the features and advantages relating to the computer program are the same as those set out above relating to the method and device according to the invention, they will not be repeated here.

BRIEF DESCRIPTION OF THE SEVERAL VIEWS OF THE DRAWINGS

The characteristics of the invention will emerge more clearly from a reading of the following description of an example embodiment, the said description being produced with reference to the accompanying drawings, among which:

FIG. 3 is an example of a Walsh-Hadamard matrix used in the present invention;

FIG. 4 is an example of a Walsh-Hadamard matrix formed by a multiplication element by element of the Walsh-Hadamard matrix of the FIG. 3 by an imposed common spreading sequence.

DETAILED DESCRIPTION OF THE INVENTION

In a Multi-Carrier transmission network, such as a MC-CDMA transmission network or an OFCDM transmission network, it is assigned to users, either at the instant of the initiation of a call, or regularly during communication, one or more spreading sequences, each element of which, at the transmitter of the network, is multiplied by a data item to be transmitted so as to control a modulator operating on a corresponding sub-carrier as it has already been explained in the introduction to the present description.

Figure 1:
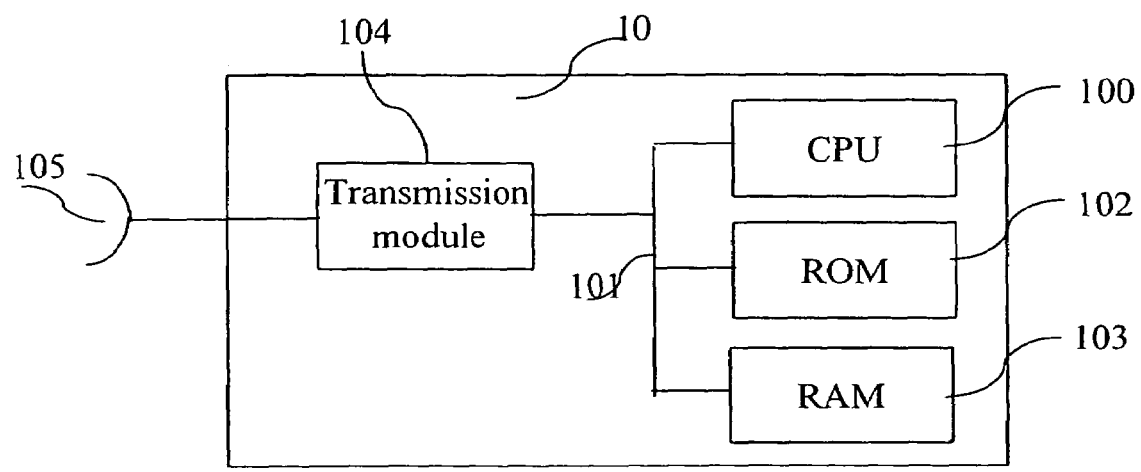
FIG. 1 is a block diagram of an example of a base station of a Multi-Carrier transmission network.

FIG. 1 is a block diagram of an example of a base station of a Multi-Carrier transmission network.

The base station 10 of the Multi-Carrier transmission network comprises a processor 100 linked by a bus 101 to a ROM memory 102, a RAM memory 103 and a MC-CDMA transmission module 104.

The processor 100, on powering up or when the base station is activated, loads the programs contained in the read only memory 102 and controls the activation of the different elements described previously. It also controls the transfer of information between the different elements by virtue of the bus 101.

Figure 2A:
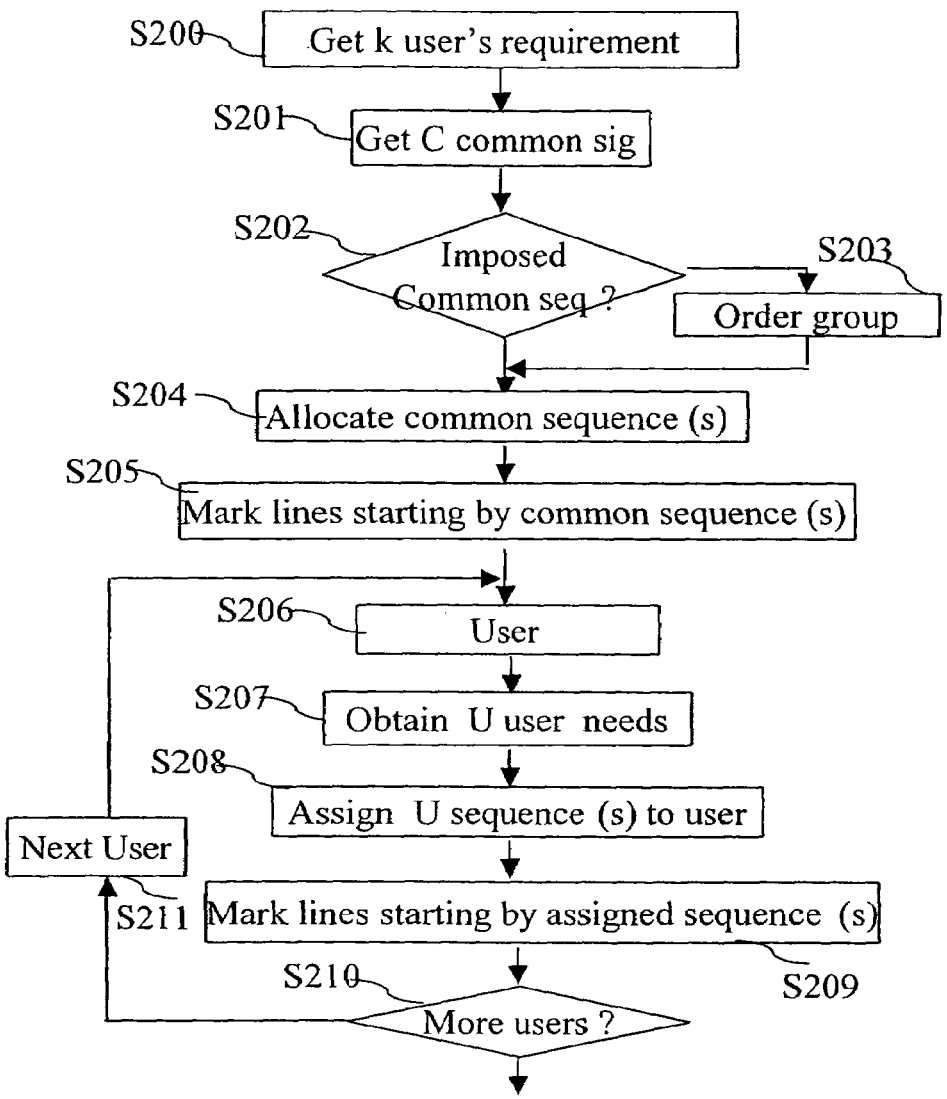
FIG. 2a is an algorithm for assigning spreading sequences to each user of a Multi-Carrier transmission network and for assigning spreading sequences to common signals according to a first embodiment of the present invention.
Figure 2B:
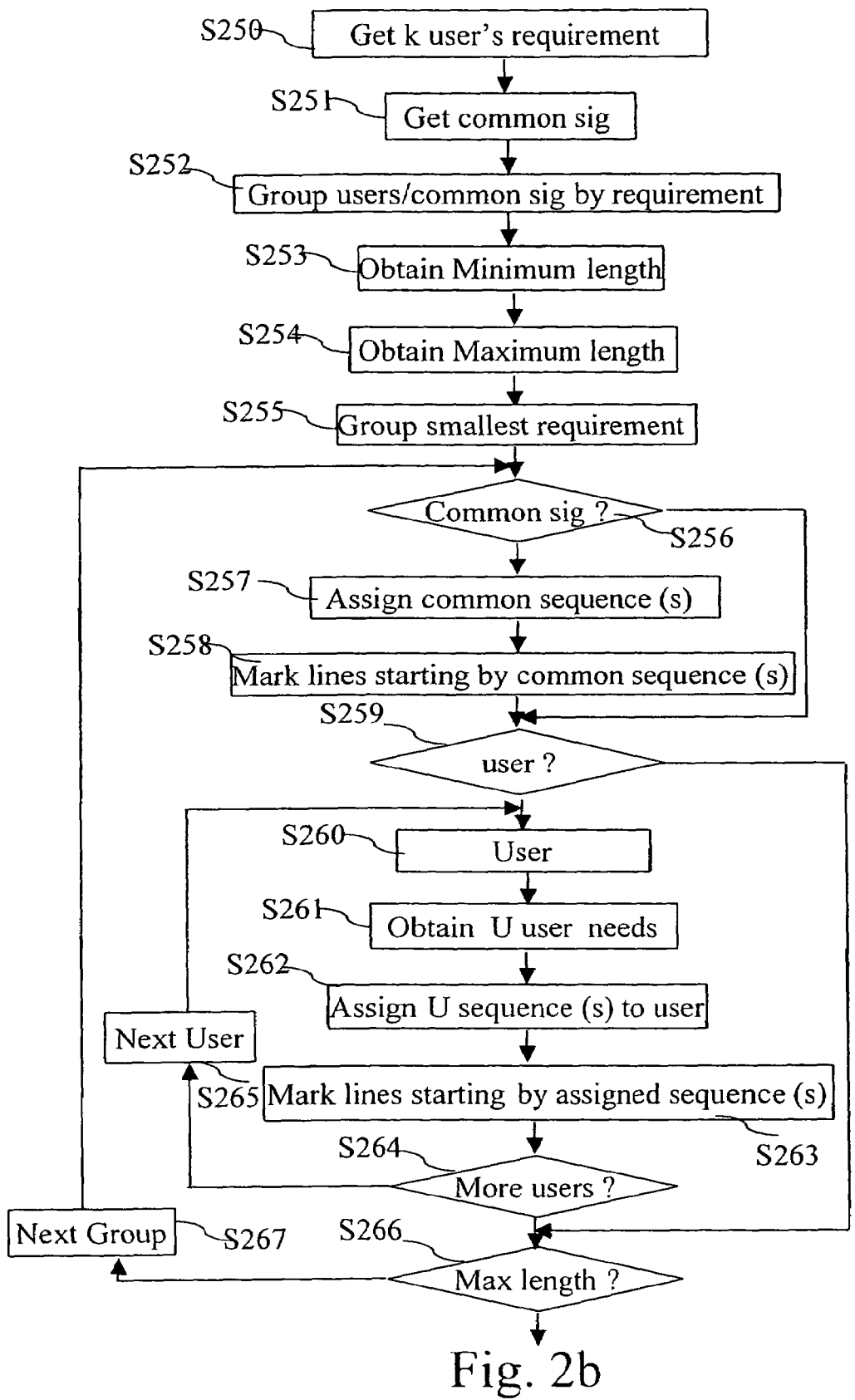
FIG. 2b is an algorithm for assigning spreading sequences to each user of a Multi-Carrier transmission network and for assigning spreading sequences to common signals according to a second embodiment of the present invention.

Regularly or each time a new active user is registered on the Multi-Carrier base station or each time an active user becomes inactive or anytime one or more users need new requirement in term of spreading sequence, the processor 100 executes the instructions associated to the algorithms described in the FIGS. 2a and 2b allowing then a dynamic assignment of spreading sequences to users.

The non-volatile memory ROM 102, contains the instructions of the programs implementing the instructions of the algorithms as described in FIGS. 2a and 2b as well as the conventional algorithms of a base station.

The ROM memory 102 includes also one or several Walsh-Hadamard matrix.

The RAM memory 103 contains the variables or temporary data necessary for the operation of the device 10 and enabling the invention to be implemented.

The Multi-Carrier transmission module 104 is connected to an antenna 105. The Multi-Carrier transmission module multiplies spreading sequences provided by the processor 100 according to the algorithms of FIGS. 2a and 2b by data items to be transmitted and then transmits it on a corresponding subcarrier. The Multi-Carrier transmission module 104 is a MC-CDMA transmission module or an OFCDM transmission module. Such modules are classical, they will not be described anymore.

FIG. 2a is an algorithm for assigning spreading sequences to each user of a Multi-Carrier transmission network and for assigning spreading sequences to common signals according to a first embodiment of the present invention.

The code of this flow chart is for example stored in the ROM 102 memory of the device 10 of FIG. 1. When this device 10 is powered up, the code is loaded into the random access memory 103 and executed by the processor 100 of the device 10.

Regularly or each time a new active user is registered on the Multi-Carrier base station or each time an active user becomes inactive or anytime one or more users have a new requirement in term of spreading sequence, the processor 100 executes the instructions associated to the algorithm described in the FIG. 2a.

A step S200, the processor 100 obtains active users requirements in term of number of spreading sequences.

For example, two users noted u1 and u2 are currently active in the Multi-Carrier transmission network.

User u1 requires one spreading sequence of length L where L is the maximum length of a spreading sequence.

User u2 requires two spreading sequences of length L.

At step S201, the processor 100 obtains the common signals requirement by the Multi-Carrier transmission network.

For example, two common signals are required by the Multi-Carrier transmission network. One of the common signals noted C1 requires an imposed common spreading sequence, the other common signal noted C2 has to be transmitted also to a plurality of users of the Multi-Carrier transmission network.

It is to be noted that such common signals are used by the Multi-Carrier transmission module 104 for broadcasting information to all active users or for a channel estimation or synchronization.

At step S202, the processor 100 checks whether or not an imposed common spreading sequence is required.

If no imposed common spreading sequence is required, the processor 100 moves to step S204.

If an imposed common spreading sequence is required, the processor 100 moves to step S203 and multiplies element by element each line of a Walsh-Hadamard matrix called hereinafter an original Walsh-Hadamard matrix by the imposed common spreading sequence and forms a new Walsh-Hadamard matrix called hereinafter an obtained Walsh-Hadamard matrix.

An original Walsh-Hadamard matrix $W_L$ of size L is defined by the following iterative rule:

$$W_1 = 1$$
$$W_L = \begin{bmatrix} W_{L/2} & W_{L/2} \\ W_{L/2} & -W_{L/2} \end{bmatrix}$$

It has to be noted here that the lines or the columns of an original Walsh-Hadamard matrix $W_L$ formed by that iterative rule are ordered in an order which is called the natural order of a Walsh-Hadamard matrix.

An obtained Walsh-Hadamard matrix is a matrix obtained by multiplying element by element each line or column of an original Walsh-Hadamard matrix by an imposed common spreading sequence. In such case, if lines of the original matrix are multiplied by an imposed common spreading sequence, the spreading sequences are included in the lines of the obtained Walsh-Hadamard matrix. If columns of the original matrix are multiplied by an imposed common spreading sequence, the spreading sequences are included in the columns of the obtained Walsh-Hadamard matrix.

An obtained Walsh-Hadamard matrix is also a matrix obtained by multiplying at least one line or one column of an original Walsh-Hadamard matrix or an obtained Walsh-Hadamard matrix as described previously, by at least one predetermined value such as a constant. In such case, if lines of the original matrix are multiplied by a constant, the spreading sequences are included in the lines of the obtained Walsh-Hadamard matrix. If columns of the original matrix or the obtained matrix as described previously are multiplied by a constant, the spreading sequences are included in the columns of the obtained Walsh-Hadamard matrix.

It has to be noted here that the lines or the columns of an obtained Walsh-Hadamard matrix $W_L$ are ordered in an order which is called the natural order of a Walsh-Hadamard matrix.

If as example the maximum length L is equal to eight, the processor 100 multiplies element by element each line of the natural Walsh-Hadamard matrix 30 of the FIG. 3 stored into the ROM memory 102 by the imposed common spreading sequence and forms an obtained Walsh-Hadamard matrix 40 of FIG. 4.

As example, the Walsh-Hadamard matrix 30 is multiplied element by element by the imposed common spreading sequence comprised in the line 302 of the Walsh-Hadamard matrix 30 and forms an obtained Walsh-Hadamard matrix 40 of FIG. 4.

The processor 100 then moves to step S204.

At step S204, the processor 100 assigns the first spreading sequence of the group of spreading sequences put in their natural order to the common signal C1 and the next following spreading sequence to the common signal C2. It has to be noted here that the first spreading sequence of the group of spreading sequences put in their natural order is the imposed spreading sequence and thanks to the multiplication made at step S203, such imposed spreading sequence is then put as the first spreading sequence of the group spreading sequences put in their natural order.

In our example, the processor then assigns the spreading sequence noted 410 in FIG. 4 to C1 and the spreading sequence noted 411 in FIG. 4 to C2.

Next, the processor 100 marks as unavailable at step S205, the lines of the Walsh-Hadamard matrix 40 which starts by the spreading sequences assigned for the imposed common sequence and/or the common signals.

According to our example, lines 410 and 411 are then marked as unavailable.

At next step S206 the processor 100 considers an active user of the active users of the Multi-Carrier network.

As example, the processor 100 considers the user u1.

At next step S207, the processor 100 obtains the requirement of the user under consideration in term of number U of spreading sequences to be assigned.

In our example, user u1 requires a single spreading sequence of length L.

Then, the processor 100 moves to step S208 and assigns required spreading sequences to the user under consideration.

In our example, the processor 100 then assigns a spreading sequence of length L to user u1. The processor 100 assigns the first line not marked as unavailable of the Walsh-Hadamard matrix 40 of the FIG. 4 to user u1. That line is the line marked 412 in FIG. 4.

Next, processor 100 marks as unavailable at step S209, the lines of the Walsh-Hadamard matrix 40 which starts by the spreading sequence assigned for user u1.

The line noted 412 of the Walsh-Hadamard matrix 40, is then marked as unavailable.

At the following step S210, the processor 100 checks whether or not if, for all active users of the Multi-Carrier Network, one or more spreading sequences have been assigned.

According to our example, no spreading sequences have been assigned to user u2, the processor 100 then moves to step S211 and considers another user of the Multi-Carrier network.

According to our example, the processor 100 considers then user u2 at step S206.

At next step S207, the processor 100 obtains the requirement of the user under consideration in term of number U of spreading sequences to be assigned.

In our example, user u2 requires two spreading sequences of length L.

Then, the processor 100 moves to step S208 and assigns the required spreading sequences to the user under consideration.

In our example, the processor 100 then assigns two spreading sequences of length L to user u2. The processor 100 assigns the two first lines not marked as unavailable of the Walsh-Hadamard matrix 40 of the FIG. 4 to user u1. These lines are the lines marked 413 and 414 in FIG. 4.

Next, processor 100 marks as unavailable at step S209, the lines of the Walsh-Hadamard matrix 40 which start by the spreading sequences assigned to user u2.

The lines noted 413 and 414 of the Walsh-Hadamard matrix 40, are then marked as unavailable.

At the following step S210, the processor 100 checks whether or not if, for all active users of the Multi-Carrier Network, one or more spreading sequences have been assigned.

If for all active users of the Multi-Carrier Network, one or more spreading sequences have been assigned, the processor 100 then ends the present algorithm.

FIG. 2b is an algorithm for assigning spreading sequences to each user of a Multi-Carrier transmission network and for assigning spreading sequences to common signals according to a second embodiment of the present invention.

The code of this flow chart is for example stored in the ROM 102 memory of the device 10 of FIG. 1. When this device 10 is powered up, the code is loaded into the random access memory 103 and executed by the processor 100 of the device 10.

Regularly or each time a new active user is registered on the Multi-Carrier base station or each time an active user becomes inactive or anytime one or more users have a new requirement in term of spreading sequence, the processor 100 executes the instructions associated to the algorithm described in the FIG. 2*b*.

A step S250, the processor 100 obtains active users requirements in term of number of spreading sequences.

For example, two users noted u1 and u2 are currently active in the Multi-Carrier transmission network.

User u1 requires one spreading sequence of length L/2 where L is the maximum length of a spreading sequence and user u2 requires one spreading sequence of length L.

At step S251, the processor 100 obtains the common signals requirements by the Multi-Carrier transmission network.

For example, two common signals are required by the Multi-Carrier transmission network. One common signal noted C1 requires one spreading sequence of length L/4 and the other one noted C2 requires one spreading sequence of length L.

Such requirements obtained, the processor 100 then moves to step S252.

At that step, the processor 100 groups the active users and the common signals according to their requirement of length of spreading sequences from the smaller requirement to the largest one.

Following our example, a first group noted GL/4 comprising the common signal C1 is made, a second group noted GL/2 comprising the user u1 is made and a third group noted GL comprising the common signal C2 and user U2 is made.

At next step S253, the processor 100 obtains the minimum length of required spreading sequences by the active users and the common signals.

Following our example, the minimum length is required by common signal C1 and is equal to L/4.

At next step S254, the processor 100 obtains the maximum length of required spreading sequences by the active users and common signals.

Following our example, the maximum length is required by common signal C2 and user u2 and the maximum length is then equal to L.

According to our example, the maximum length is equal to eight and the group of spreading sequences is the Walsh-Hadamard matrix 30 of FIG. 3.

At next step S255, the processor 100 considers the group of active users and common signals requiring the smallest length of spreading sequences.

According to our example, group GL/4 is then considers. It comprises the common signal C1.

The processor 100 then moves to step S256 and checks whether or not the group under consideration comprises at least one common signal.

If the group under consideration comprises at least one common signal, the processor 100 moves to step S257.

If the group under consideration doesn't comprise any common signal, the processor 100 moves to step S259.

According to our example, group GL/4 comprises the common signal C1.

The processor then moves to step S257 and assigns required common spreading sequences.

In our example, the processor then assigns a spreading sequence of L/4 length. According to our example, the processor 100 assigns the two first coefficients of the first line noted 300 of the Walsh-Hadamard matrix 30 of the FIG. 3 to common signal C1. The Walsh-Hadamard matrix 30 is stored into the ROM memory 102.

Next, processor 100 marks as unavailable at step S258, the lines of the Walsh-Hadamard matrix 30 which start by the sequence assigned to the common signal C1.

The lines noted 300, 302, 304, 306 of the Walsh-Hadamard matrix 30, having the same two first coefficients as ones assigned previously at step S257, are then marked as unavailable.

The processor 100 then moves to step S259 and checks whether or not the group under consideration comprises at least one user.

If the group under consideration comprises at least one user, the processor 100 moves to step S260.

If the group under consideration doesn't comprise any user, the processor 100 moves to step S266.

According to our example, group GL/4 doesn't comprise any user, the processor 100 then goes to step S266.

At that step, the processor 100 checks if the length of spreading sequence which has been assigned previously is equal to the maximum length of spreading sequence obtained at step S254.

According to our example, the length of spreading sequence which has been assigned previously is lower than to the maximum length of spreading sequence obtained at step S254, the processor 100 then moves to step S267.

At that step, the processor 100 considers then the next group formed at step S252 which comprises common signals and/or users having a larger requirement in term of length of spreading sequences.

According to our example, group GL/2 is then considered. It comprises the user u1.

The processor 100 then moves to step S256 and checks whether or not the group under consideration comprises at least one common signal.

According to our example, as the group under consideration doesn't comprise any common signal, the processor then 100 moves to step S259.

At that step, the processor 100 then checks whether or not the group under consideration comprises at least one user.

According to our example, the group under consideration comprises at least one user, the processor 100 then moves to step S260.

At step S260, the processor 100 considers a user among the users comprised within the group under consideration and obtains at step S261 the user's need in term of number of spreading sequences of the length under consideration to be assigned.

The processor then moves to step S262 and assigns required spreading sequence to the user under consideration.

According to our example, the processor 100 then assigns the first available spreading sequence of L/2 length to user u1. According to our example, the processor 100 assigns the four first coefficients of the first available line noted 301 of the Walsh-Hadamard matrix 30 of the FIG. 3 to user u1.

Next, processor 100 marks as unavailable at step S263, the lines of the Walsh-Hadamard matrix 30 which start by the sequences assigned previously.

The lines noted 301 and 305 of the Walsh-Hadamard matrix 30, having the same four first coefficients as ones assigned previously at step S257, are then marked as unavailable.

The processor 100 then moves to step S264 and checks whether or not the group under consideration comprises other users.

If other users are included within the group, the processor 100 then goes to step S265 and considers another user.

The processor 100 executes the loop made by steps S260 to 264 and assigns to each user of the group under consideration the required spreading sequences and marks spreading sequences which starts by the assigned spreading sequences as unavailable.

If no other users are included within the group, the processor 100 then goes to step S266.

At that step, the processor 100 checks if the length of spreading sequence which has been assigned previously is equal to the maximum length of spreading sequence obtained at step S254.

According to our example, the length of spreading sequence which has been assigned previously is lower than to the maximum length of spreading sequence obtained at step S254, the processor 100 then moves to step S267.

At that step, the processor 100 considers then the next group formed at step S252 which comprises common signals and/or users having larger requirement in term of length of spreading sequences.

According to our example, group GL is then considered. It comprises the common signal C2 and user u2.

The processor then moves to step S256 and checks whether or not a common signal is included in the group under consideration.

If the group under consideration comprises at least one common signal, the processor 100 moves to step S257.

According to our example, group GL comprises the common signal C2.

The processor then moves to step S257 and assigns required common spreading sequences.

In our example, the processor then assigns a spreading sequence of L length. According to our example, the processor 100 assigns the eight coefficients of the first available line noted 303 of the Walsh-Hadamard matrix 30 of the FIG. 3 to common signal C2.

It is to be noted that lines 300, 301 and 302 have been previously marked as unavailable.

Next, processor 100 marks as unavailable at step S258, the lines of the Walsh-Hadamard matrix 30 which start by the spreading sequence assigned as the common signal C2.

The line noted 303 having the same coefficients as ones assigned previously at step S257, is then marked as unavailable.

The processor 100 then moves to step S259 and checks whether or not the group under consideration comprises at least one user.

If the group under consideration comprises at least one user, the processor 100 moves to step S260.

According to our example, the group under consideration comprises at least one user i.e. user u2, the processor 100 then moves to step S260.

At step S260, the processor 100 considers a user among the users comprised within the group under consideration and obtains at step S261 the user's needs in term of number of spreading sequences to be assigned of the length under consideration.

The processor then moves to step S262 and assigns required common spreading sequence to user under consideration.

According to our example, the processor 100 then assigns a spreading sequence of length L length to user u2. According to our example, the processor 100 assigns the coefficients of the first available line noted 307 of the Walsh-Hadamard matrix 30 of the FIG. 3 to user u2.

Next, processor 100 marks as unavailable at step S263, the lines of the Walsh-Hadamard matrix 30 which start by the sequence assigned previously.

The line noted 307 of the Walsh-Hadamard matrix 30, having the same coefficients as ones assigned previously at step S257, is then marked as unavailable.

The processor 100 then moves to step S264 and checks whether or not the group under consideration comprises other users.

If other users are included within the group, the processor 100 then goes to step S265 and considers another user.

If no more users are included in the group under consideration, the processor then moves to step S266.

At that step, the processor 100 checks if the length of spreading sequence which has been assigned previously is equal to the maximum length of spreading sequence obtained at step S254.

According to our example, this the case, the processor 100 then stops the algorithm, all required spreading sequences have been assigned.

It has to be noted that the description of the algorithms of FIGS. 2*a* and 2*b* has been made using lines of a Walsh-Hadamard matrix. Obviously, columns of a Walsh-Hadamard matrix can be used also in the present invention.

It has to be noted also here that instead of using Walsh-Hadamard spreading sequences, other kind of spreading sequences can be used in the present invention. As example, orthogonal complementary Golay sequences can be used also.

Naturally, many modifications can be made to the embodiments of the invention described above without departing from the scope of the present invention.

The invention claimed is:

1. A method of dynamically assigning spreading sequences of a group of spreading sequences to users of a Multi-Carrier transmission network and/or to at least a common signal for a plurality of users of the Multi-Carrier transmission network, comprising:

arranging the spreading sequences in a natural order in the group of spreading sequences; and dynamically assigning the spreading sequences of the group of spreading sequences according to their order in the group of spreading sequences to users of the Multi-Carrier transmission network and/or to at least a common signal to a plurality of users of the Multi-Carrier transmission network, wherein the dynamically assigning comprises assigning a spreading sequence which does not start with same coefficients of a spreading sequence already assigned to a user at the same assignment period, or which does not start with same coefficients of a spreading sequence calculated from a spreading sequence already assigned to a user at the same assignment period.

2. The method according to claim 1, wherein
the spreading sequences are Walsh-Hadamard sequences and the group of spreading sequences is a Walsh-Hadamard matrix whose lines or columns are put in the natural order.

3. The method according to claim 1, wherein
the Multi-Carrier transmission network is an Orthogonal Frequency and Code Division Multiplexing transmission Network.

4. The method according to claim 1, wherein
the Multi-Carrier transmission network is a Multi-Carrier Code Division Multiple Access transmission Network.

5. The method according to claim 1, wherein
the dynamically assigning includes assigning a first available spreading sequence of the group of spreading sequences to a user or common signal requiring a shortest length of spreading sequences.

6. A method of dynamically assigning spreading sequences of a group of spreading sequences to users of a Multi-Carrier transmission network and/or to at least a common signal for a plurality of users of the Multi-Carrier transmission network, comprising:

arranging the spreading sequences in a natural order in the group of spreading sequences;

dynamically assigning the spreading sequences of the group of spreading sequences according to their order in the group of spreading sequences to users of the Multi-Carrier transmission network and/or to at least a common signal to a plurality of users of the Multi-Carrier transmission network;

obtaining requirements of users indicating the length and/or the number of spreading sequences to be assigned to each user of the Multi-Carrier transmission network;

assigning the first available spreading sequences of the group of spreading sequences to users requiring the shortest length of spreading sequences; and marking as not available the spreading sequences of the group of spreading sequences already assigned to a user, or which start by a spreading sequence already assigned to a user, or which start by a spreading sequence calculated from a spreading sequence already been assigned to a user.

7. The method according to claim 6, further comprising:

assigning the following available spreading sequences of the group of spreading sequences according to the order of spreading sequences in the group of spreading sequences to users requiring longer length of spreading sequences than the length of already assigned spreading sequences; and marking as not available the spreading sequences of the group of spreading sequences which are already assigned to a user, or which start by a spreading sequence already assigned to a user, or which start by a spreading sequence calculated from a spreading sequence already been assigned to a user.

8. A method of dynamically assigning spreading sequences of a group of spreading sequences to users of a Multi-Carrier transmission network and/or to at least a common signal for a plurality of users of the Multi-Carrier transmission network, comprising:

arranging the spreading sequences in a natural order in the group of spreading sequences; and dynamically assigning the spreading sequences of the group of spreading sequences according to their order in the group of spreading sequences to users of the Multi-Carrier transmission network and/or to at least a common signal to a plurality of users of the Multi-Carrier transmission network, wherein a common signal requires an imposed common spreading sequence, and prior to the assignment of spreading sequences to users, the method further comprises:

multiplying element by element the spreading sequences of the group of spreading sequences by the imposed common spreading sequence to form an obtained group of spreading sequences;

assigning the first available spreading sequence of the obtained group of spreading sequences to the common signal requiring an imposed common spreading sequence; and marking as not available, the spreading sequence of the obtained group of spreading sequences assigned to the common signal requiring an imposed common spreading sequence, or the spreading sequences which start by the spreading sequence assigned to the common signal requiring an imposed common spreading sequence, or the spreading sequences which start by a spreading sequence calculated from the spreading sequence assigned to the common signal requiring an imposed common spreading sequence.

9. A method of dynamically assigning spreading sequences of a group of spreading sequences to users of a Multi-Carrier transmission network and/or to at least a common signal for a plurality of users of the Multi-Carrier transmission network, comprising:

arranging the spreading sequences in a natural order in the group of spreading sequences;

dynamically assigning the spreading sequences of the group of spreading sequences according to their order in the group of spreading sequences to users of the Multi-Carrier transmission network and/or to at least a common signal to a plurality of users of the Multi-Carrier transmission network;

obtaining requirements of users indicating a length and/or number of spreading sequences to be assigned to each user of the Multi-Carrier transmission network and requirements of common signals indicating a length and/or number of spreading sequences to be assigned to the plurality of users of the Multi-Carrier transmission network;

forming groups of users and common signals according to the length of spreading sequences, wherein if at least one common signal is in a group of users and common signals requiring a shortest length of spreading sequences:

assigning the first available spreading sequences of the group of spreading sequences to each common signal in the group of users and common signals requiring the shortest length of spreading sequences, and marking as not available, the spreading sequences of the group of spreading sequences which are already assigned to a common signal, or which start by a spreading sequence already assigned to a common signal, or which start by a spreading sequence calculated from a spreading sequence already assigned to a common signal, and if at least one user is in the group of users and common signals requiring the shortest length of spreading sequences:

assigning the following available spreading sequences of the group of spreading sequences to each user of the group of users and common signals requiring the shortest length of spreading sequences, and marking as not available, the spreading sequences of the group of spreading sequences already assigned to a user, or which start by a spreading sequence already assigned to a user, or which start by a spreading sequence calculated from a spreading sequence already assigned to user.

10. The method according to claim 9, further comprising:

if at least one common signal is in a group of users and common signals requiring longer length of spreading sequences:

assigning the following available spreading sequences of the group of spreading sequences to each common signal in the group of users and common signals requiring longer length of spreading sequences, and marking as not available, the spreading sequences of the group of spreading sequences already assigned to a common signal, or which start by a spreading sequence already assigned to a common signal, or which start by a spreading sequence calculated from a spreading sequence already assigned to a common signal, and if at least one user is in the group of users and common signals requiring longer length of spreading sequences:

assigning the following available spreading sequences of the group of spreading sequences to each user of the group of users and common signals requiring longer length of spreading sequences, and marking as not available, the spreading sequences of the group of spreading sequences already assigned to a user, or which start by a spreading sequence already assigned to a user, or which start by a spreading sequence calculated from a spreading sequence already assigned to a user.

11. A base station for dynamically assigning spreading sequences of a group of spreading sequences to users of a Multi-Carrier transmission network and/or to at least a common signal for a plurality of users of the Multi-Carrier transmission network, comprising:

a processor configured to arrange the spreading sequences in a natural order in the group of spreading sequences; and a processor configured to dynamically assign the spreading sequences of the group of spreading sequences according to their order in the group of spreading sequences to users of the Multi-Carrier transmission network and/or to at least a common signal to a plurality of users of the Multi-Carrier transmission network, wherein the processor is configured to dynamically assign a spreading sequence which does not start with same coefficients of a spreading sequence already assigned to a user at the same assignment period, or which does not start with same coefficients of a spreading sequence calculated from a spreading sequence already assigned to a user at the same assignment period.

12. The base station according to claim 11, wherein the processor is configured to assign a first available spreading sequence of the group of spreading sequences to a user or common signal requiring a shortest length of spreading sequences.

13. A computer readable medium encoded with computer program instructions, which when executed by a computer cause the computer to perform a method of dynamically assigning spreading sequences of a group of spreading sequences to users of a Multi-Carrier transmission network and/or to at least a common signal for a plurality of users of the Multi-Carrier transmission network, comprising:

arranging the spreading sequences in a natural order in the group of spreading sequences; and dynamically assigning the spreading sequences of the group of spreading sequences according to their order in the group of spreading sequences to users of the Multi-Carrier transmission network and/or to at least a common signal to a plurality of users of the Multi-Carrier transmission network, wherein the dynamically assigning comprises assigning a spreading sequence which does not start with same coefficients of a spreading sequence already assigned to a user at the same assignment period, or which does not start with same coefficients of a spreading sequence calculated from a spreading sequence already assigned to a user at the same assignment period.

14. The computer readable medium according to claim 13, wherein the dynamically assigning includes assigning a first available spreading sequence of the group of spreading sequences to a user or common signal requiring a shortest length of spreading sequences.

* * * * *